(12) United States Patent
Lisenfeld et al.

(10) Patent No.: US 12,718,135 B2
(45) Date of Patent: Aug. 25, 2026

(54) ENHANCING THE COHERENCE OF SUPERCONDUCTING QUANTUM BITS

(71) Applicant: Google LLC, Mountain View, CA (US)

(72) Inventors: Jürgen Lisenfeld, Karlsruhe (DE); Alexander Bilmes, Karlsruhe (DE); Alexey Ustinov, Karlsruhe (DE); Johannes Rotzinger, Heidelberg (DE)

( * ) Notice: Subject to any disclaimer, the term of this patent is extended or adjusted under 35 U.S.C. 154(b) by 63 days.

(21) Appl. No.: 18/725,611

(22) PCT Filed: Dec. 29, 2022

(86) PCT No.: PCT/US2022/054224
§ 371 (c)(1),
(2) Date: Jun. 28, 2024

(87) PCT Pub. No.: WO2023/129637
PCT Pub. Date: Jul. 6, 2023

(65) Prior Publication Data

US 2025/0103939 A1 Mar. 27, 2025

Related U.S. Application Data

(60) Provisional application No. 63/294,672, filed on Dec. 29, 2021.

(51) Int. Cl.
*G06N 10/70* (2022.01)
*G06N 10/40* (2022.01)

(52) U.S. Cl.
CPC ............. *G06N 10/70* (2022.01); *G06N 10/40* (2022.01)

(58) Field of Classification Search
CPC ......... G06N 10/70; G06N 10/40; B82Y 10/00
USPC .......................................................... 714/699
See application file for complete search history.

(56) References Cited

U.S. PATENT DOCUMENTS

| | | | | |
|---|---|---|---|---|
| 10,097,186 | B1 * | 10/2018 | Epstein | H03K 19/1958 |
| 11,112,842 | B1 * | 9/2021 | Smith | G06N 10/40 |
| 2018/0260729 | A1 * | 9/2018 | Abdo | B82Y 10/00 |
| 2021/0334689 | A1 | 10/2021 | Klimov et al. | |
| 2022/0374755 | A1 * | 11/2022 | Didier | G06N 10/20 |
| 2025/0280741 | A1 * | 9/2025 | Rugar | H10N 60/12 |

FOREIGN PATENT DOCUMENTS

| | | |
|---|---|---|
| JP | 2016-512672 | 4/2016 |

OTHER PUBLICATIONS

Anderson et al., "Anomalous low temperature thermal properties of glasses and spin glasses" Philosophical Magazine 25, 1972, 9 pages.
Arute et al., "Quantum supremacy using a programmable superconducting processor" CoRR, Submitted on Dec. 2019, arXiv:1910.11333v2, 67 pages.

(Continued)

*Primary Examiner* — James C Kerveros
(74) *Attorney, Agent, or Firm* — Fish & Richardson P.C.

(57) ABSTRACT

Methods for enhancing the coherence of superconducting quantum bits with electric fields are disclosed comprising providing at least one qubit electrode comprising detrimental defects and intrinsic qubit resonance; and applying an intrinsic parameter of an electric field to the qubit electrode in order to tune the defects away from the qubit resonance, so that the energy relaxation time T1 of the qubit increases.

13 Claims, 4 Drawing Sheets

(56) References Cited

OTHER PUBLICATIONS

Barends et al., "Coherent josephson qubit suitable for scalable quantum integrated circuits" CoRR, Submitted on Apr. 2013, arXiv:1304.2322v1, 10 pages.
Bilmes et al., "Electronic decoherence of two-level systems in a josephson junction" CoRR, Submitted on Aug. 2017, arXiv:1609.06173v3, 14 pages.
Bilmes et al., "In-situ bandaged josephson junctions for superconducting quantum processors" CoRR, Submitted on Oct. 2021, arXiv:2101.01453v3, 7 pages.
Bilmes et al., "Resolving the positions of defects in superconducting quantum bits." Scientific reports 10.1, Feb. 2020, 3090: 6 pages.
Black et al., "Spectral diffusion, phonon echoes, and saturation recovery in glasses at low temperatures" Phys. Rev. B 16, 1977, 2879-2895.
Blinov et al., "Comparison of cloud-based ion trap and superconducting quantum computer architectures" CoRR, Submitted on Jan. 2021, arXiv:2102.00371v1, 6.
Brun, "Quantum error correction" CoRR, Submitted on Oct. 2019, arXiv:1910.03672v1, 35 pages.
Burnett et al., "Decoherence benchmarking of superconducting qubits" npj Quantum Information, 5(1), Jun. 2019, 54: 8 pages.
Burnett et al., "Evidence for interacting two-level systems from the 1/f noise of a superconducting resonator" Nature Communications 5.1, Jun. 2014, 4119: 6 pages.
Carroll et al., "Dynamics of superconducting qubit relaxation times" CoRR, Submitted on May 2021, arXiv:2105.15201v1, 10 pages.
Dunsworth et al., "Characterization and reduction of capacitive loss induced by sub-micron josephson junction fabrication in superconducting qubits" CoRR, Submitted on Jun. 2017, arXiv:1706.00879v1, 9 pages.
Faoro et al., "Interacting tunneling model for two-level systems in amorphous materials and its predictions for their dephasing and noise in superconducting microresonators" Physical Review B 91.1, Jan. 2015, 014201: 12 pages.
Faoro et al., "Internal Loss of Superconducting Resonators Induced by Interacting Two Level Systems" CoRR, Submitted on Jan. 2012, arXiv:1201.5299v1, 5 pages.
Forouzani et al., "Absract: A Compact Qubit with Tuned Protection from Sparse Defects" Abstract, Presented at APS March Meeting vol. 2017, Mar. 2017, 1 page (abstract only).
Foxen et al., "Qubit compatible superconducting interconnects." Quantum Science and Technology 3.1, Nov. 2017, 014005: 11 pages.
Hung et al., "Probing hundreds of individual quantum defects in polycrystalline and amorphous alumina" CoRR, Submitted on Jul. 2021, arXiv:2107.04131v1, 17 pages.
International Preliminary Report on Patentability in International Appln. No. PCT/US2022/054224, mailed on Jul. 11, 2024, 13 pages.
International Search Report and Written Opinion in International Appln. No. PCT/US2022/054224, mailed on Mar. 30, 2023, 19 pages.
Jäckle, "On the ultrasonic attenuation in glasses at low temperatures" Zeitschrift für Physik A Hadrons and nuclei 257, 1972, 212-223.
Jurcevic et al., "Demonstration of quantum vol. 64 on a superconducting quantum computing system." Quantum Science and Technology 6.2, Mar. 2021, 025020:1-10.
Karalekas et al., "A quantum-classical cloud platform optimized for variational hybrid algorithms" CoRR, Submitted on May 2020, arXiv:2001.04449v3, 21 pages.
Kim et al., "Anomalous avoided level crossings in a cooper-pair box spectrum" CoRR, Submitted on Oct. 2008, arXiv:0810.2455v2, 17 pages.
Klimov et al., "Fluctuations of energy-relaxation times in superconducting qubits" Phys. Rev. Lett. 121, Aug. 2018, 090502:1-5.
Koch et al., "Charge-insensitive qubit design derived from the cooper pair box" Physical Review A 76, Oct. 2007, 042319:1-19.
Lisenfeld et al., "Electric field spectroscopy of material defects in transmon qubits" npj Quantum Information 5.1, Nov. 2019, 105:1-6.
Lisenfeld et al., "Observation of directly interacting coherent two-level systems in an amorphous material." Nature communications 6.1, Feb. 2015, 6182: 6 pages.
Martinis et al., "Decoherence in Josephson qubits from dielectric loss" CoRR, Submitted on Jul. 2005, arXiv:cond.mat/0507622v1, 15 pages.
Meißner et al., "Probing individual tunneling fluctuators with coherently controlled tunneling systems" CoRR, Submitted on Dec. 2017, arXiv:1710.05883v2, 7 pages.
Müller et al., "Interacting two-level defects as sources of fluctuating high-frequency noise in superconducting circuits" Phys. Rev. B 92, Jul. 2015, 035442:1-13.
Müller et al., "Towards understanding two-level-systems in amorphous solids—insights from quantum circuits" CoRR, Submitted on Oct. 2019, arXiv:1705.01108v3, 34 pages.
Murray, "Material matters in superconducting qubits" CoRR, Submitted on Oct. 2021, arXiv:2106.05919v2, 98 pages.
Osman et al., "Simplified josephson-junction fabrication process for reproducibly high-performance superconducting qubits" CoRR, Submitted on Nov. 2020, arXiv:2011.05230v1, 6 pages.
Phillips, "Two-level states in glasses" Reports on Progress in Physics 50, 1987, 1657-1708.
Schlör et al., "Correlating decoherence in transmon qubits: Low frequency noise by single fluctuators." Physical review letters 123.19, Nov. 2019, 190502:1-6.
Wang et al., "Surface participation and dielectric loss in superconducting qubits" CoRR, Submitted on Oct. 2015, arXiv:1509.01854v2, 11 pages.
Office Action in Australian Appln. No. 2022426693, mailed on Jun. 17, 2025, 3 pages.
Office Action in Canadian Appln. No. 3,244,991, mailed on Jun. 9, 2025, 6 pages.
Office Action in Japanese Appln. No. 2024-539856, mailed on Jul. 1, 2025, 8 pages (with English translation).
Office Action in Australian Appln. No. 2022426693, mailed on Feb. 26, 2026, 4 pages.

* cited by examiner

ENHANCING THE COHERENCE OF SUPERCONDUCTING QUANTUM BITS

CROSS-REFERENCE TO RELATED APPLICATIONS

This application is a U.S. National Stage application under 35 U.S.C. § 371 and claims the benefit of priority to International Application No. PCT/US2022/054224, having an International Filing date of 29 Dec. 2022, the contents of which are hereby incorporated by reference.

FIELD OF THE INVENTION

This description relates generally to a method for enhancing the coherence of superconducting quantum bits (qubits) and a method for determining the optimization of the enhancement of coherence of superconducting quantum bits.

BACKGROUND

Superconducting integrated circuits have evolved into a powerful architecture for creating artificial quantum systems. In state-of-the-art experiments, tens of qubits are coherently operated as quantum simulators and universal processors while access to prototype devices is being offered via the cloud to accelerate the development of practical quantum algorithms. On the way forward, mitigating decoherence is one of the central challenges, because it hinders further up-scaling and implementation of quantum error correction.

Known processors typically employ transmon qubits that are based on the discrete energy levels in non-linear LC-resonators formed by capacitively shunted Josephson junctions. A large part of decoherence in such qubits is due to dielectric loss in the native surface oxides of the capacitor electrodes. This loss shows a remarkably structured frequency dependence which originates in the individual resonances of spurious atomic tunneling defects.

SUMMARY

Methods for enhancing the coherence of superconducting quantum bits (qubits) and for determining the optimization of the enhancement of coherence of superconducting quantum bits are disclosed.

Especially a method for enhancing the coherence of superconducting quantum bits (qubits) is described comprising the following steps of providing at least one qubit electrode comprising detrimental defects and intrinsic qubit resonance and applying an intrinsic parameter of an electric field to the qubit electrode in order to tune the defects away from the qubit resonance.

In an embodiment, the method has been presented that extends the energy relaxation time T1 of superconducting transmon qubits. In this embodiment, the qubit electrodes may be exposed to a DC-electric field at which the most detrimental TLS-defects are tuned out of qubit resonance. Averaging over qubit working frequencies and a 30-minute time interval, the T1-time was improved by at least 23% compared to zero applied electric field.

In an embodiment, the intrinsic parameter is the strength of the electric field.

In an embodiment, the detrimental defects are parasitic two-level quantum systems (TLS).

Especially, a method for determining the enhancement of coherence of superconducting quantum bits (qubits) is described, of which the method is comprising the following steps: a) providing at least one qubit electrode, wherein the qubit electrode comprising detrimental defects, and an intrinsic qubit energy relaxation time (T1), and a qubit working frequency; and b) applying different values of an intrinsic parameter of an electric field to the qubit electrode; and c) determining the qubit energy relaxation time (T1) over time for each of the different values.

In an embodiment, the steps are used at different qubit working frequencies for optimization.

In an embodiment, the electric field is a DC electrical field.

In an embodiment, the method further comprising quantifying the enhancement of the coherence by determining the qubit energy relaxation time (T1); and comparing the determined qubit energy relaxation time to the qubit energy relaxation time determined at zero applied electrical field.

In an embodiment, the quantification of enhancement was at least 23% of all determinations, i.e. all tested qubit resonance frequencies, preferably at least 20% of 46% determinations, or preferably at least 10% of 67% determinations.

In an embodiment, the qubit energy relaxation time (T1) is determined within a time frame of 30 mins. Depending on the strength of the electrical field applied different time frame are applicable, i.e. if the strength is higher the time frame might shorter.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 4*b* is a schematic that shows the cross-section of an example flip-chip stack.

FIG. 4*c* is a heat map that shows a simulated electric field strength used in an example flip chip stack.

DETAILED DESCRIPTION

Figure 1:
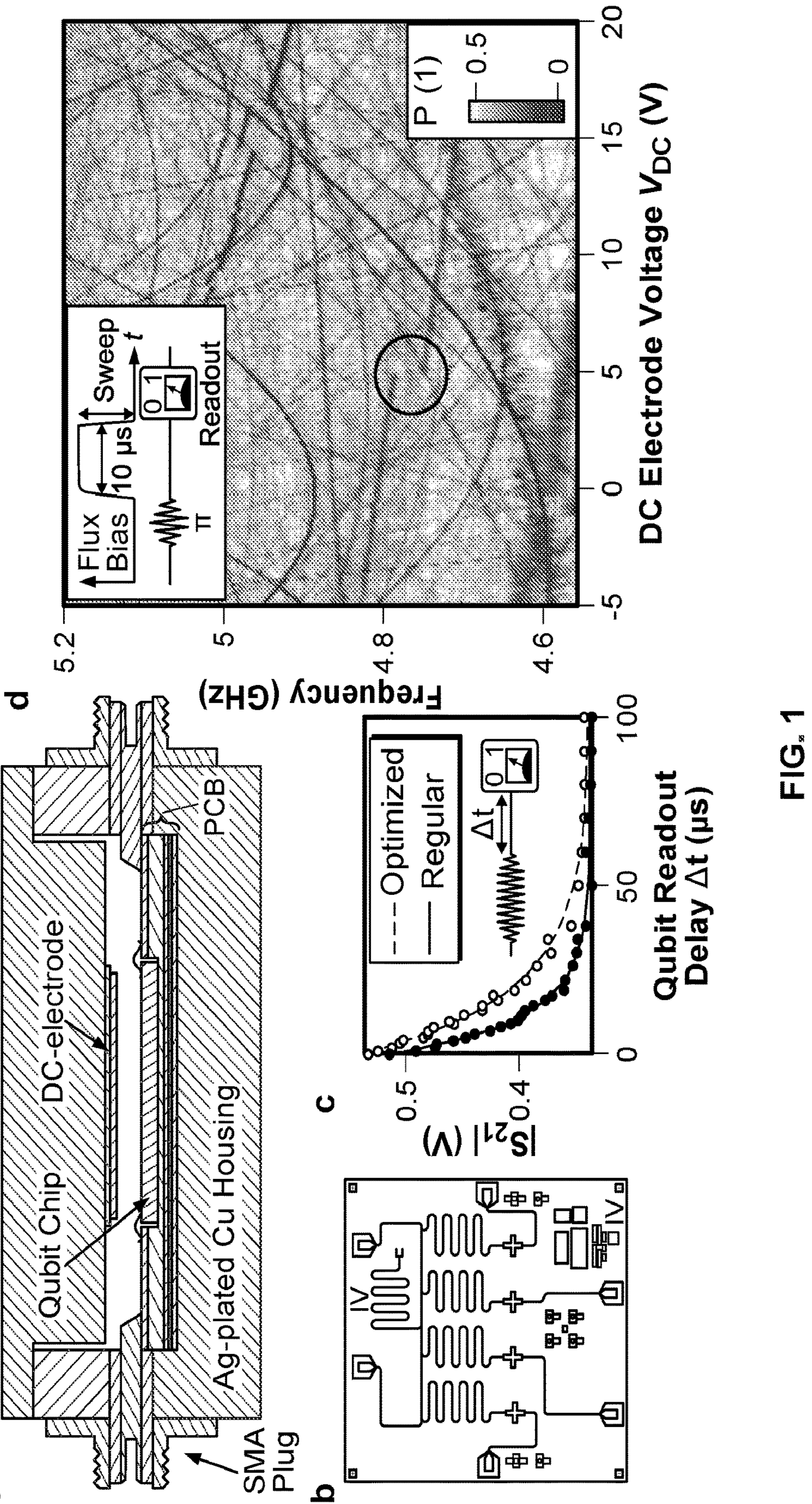
FIG. 1*a* is a cross-section through the sample housing of an example of a qubit electrode.
FIG. 1*b* is a photograph of XMon qubit samples used in accordance with one embodiment.
FIG. 1*c* is a plot of example measurements of a decaying qubit population after a long exciting microwave pulse (see inset) to determine the energy relaxation time (T1).
FIG. 1*d* is a plot that shows resonances of individual two-level quantum systems (TLS).

In the following description, for the purposes of explanation, numerous specific details are set forth in order to provide a thorough understanding of the present invention. It will be apparent, however, that the subject matter of the present disclosure may be practiced without these specific details. In other instances, well-known structures and devices are shown in block diagram form in order to avoid unnecessarily obscuring the subject matter of the present disclosure.

However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in an embodiment.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. Electric field tuning of TLS
2. Method for optimizing the qubit relaxation time T1
3. Benchmarking the method of the optimization routine
4. Integration with quantum processors
5. Conclusions Electric Field Tuning of TLS The overall concept of the subject matter disclosed is providing a method for enhancing and a method for determining the enhancement of the coherence of qubits, in order to provide an optimization routine for determining the energy relaxation time (T1). In order to enhance the coherence of a qubit, an electric field is applied to the qubit electrode in order to tune the influences of the detrimental defects of the qubit electrode away from the qubit resonance. By tuning away the defects from the qubit resonance the energy relaxation time (T1) of the qubit increases, which enhances the coherence of the qubit significantly. This provides significant benefits in the applicability and reliability of the qubit in quantum computing operations.

For our experiments, a transmon qubit sample was fabricated in the so-called 'X-Mon' design following Barends et al. as shown in FIG. 1*b*. It should be noted, that other qubit sample than transmon qubit are applicable. The electric field for TLS tuning was generated by a DC-electrode installed on the lid of the sample housing 0.9 mm above the qubit chip's surface as illustrated in FIG. 1*a*. The electrode in this example was made from a copper foil that is insulated by Kapton foil from the housing. To improve E-field homogeneity in vicinity of the qubits, the electrode had a size that was comparable to the qubit chip.

The response of TLS to the applied electric field was observed by measuring the qubit energy relaxation time $T_1$ as a function of qubit frequency, which shows Lorentzian minima whenever sufficiently strongly interacting TLS are tuned into resonance. A detailed view on the rich TLS spectrum as shown in FIG. 1*d* was obtained using swap-spectroscopy. With this protocol, TLS were detected by the resonant reduction of the qubit's excited state population after it was tuned for a fixed time interval to various probing frequencies. In the studied sample, only a single TLS was observed that did not couple to the applied E-field, indicating that it was likely residing in a tunnel barrier of the submicron-sized qubit junctions where no DC-electric field exists. This confirms that only a few resonant TLS are typically found in small area Josephson junctions, and dielectric loss is dominated by defects on the interfaces of the qubit electrodes. This is true as long as qubits are fabricated with methods that avoid the formation of large-area stray Josephson junctions which are known to contribute many additional defects.

In FIG. 1*d*, some TLS were observed whose resonance frequencies show strong fluctuations or telegraphic switching due to their interaction with low-energy TLS that were thermally activated. TLS may also interact with classical bistable charge fluctuators that have a very small switching rate between their states. Since these fluctuators may also be tuned by the applied electric field, hysteresis effects may appear in electric field sweeps since the state of a fluctuator, and hereby the resonance frequency of a high-energy TLS, may depend on the history of applied E-fields. An example of such an interacting TLS-fluctuator system is marked by the circle in FIG. 1*d*, where the resonance frequency of a TLS abruptly changed.

Method for Optimizing the Qubit Relaxation Time T1

As is evident from FIG. 1*d*, at each qubit operation frequency there was a preferable electric field bias where most of the dominating TLS were tuned out of qubit resonance and the $T_1$ time is maximized. In the following, a routine by which an optimal E-field bias can be automatically determined is described.

The method for determining the optimization comprises that the qubit $T_1$-time is measured for a range of applied electric fields. Hereby, the $T_1$-time is obtained from exponential fits to the decaying qubit population probability after it was excited by a microwave pulse, measured using the common protocol shown in the inset of FIG. 1*c*. FIG. 2*a* shows the resulting electric field dependence of $T_1$ (cross-shaped data points) over a range of applied voltage between −10 and 10 V, measured at various qubit resonance frequencies (rows I to III). These data are then smoothed by a nearest-neighbor average (black curve in FIG. 2*a*) to average out individual dips and peaks in order to amplify broader maxima that promise more stable improvements.

Next, the E-field is set to the value where the maximum $T_1$-time occurred. For example, with respect to the measurements performed in FIG. 2*a*, the circles denote where the maximum T1-time occurred. Hereby, it is recommended to approach the detected optimal E-field from the same value where the previous E-field sweep was started. This helps to avoid the mentioned hysteresis effects in the TLS resonance frequencies that may occur when they are coupled to meta-stable field-tunable TLS whose state depends on the history of applied E-fields. Finally, a second pass is performed, sweeping the E-field in finer steps around its previously determined optimum value until the obtained $T_1$ time is close to the maximum value that was observed in the previous sweep. This ensures that hysteresis effects are better compensated and the finer step helps to avoid sharp dips that were not resolved in the first pass.

Benchmarking the Method of the Optimization Routine

To test the efficiency of the optimization routine, first the qubit $T_1$ was repeatedly observed during 30 minutes at zero applied electric field as a reference (black shaded data in FIG. 2*b*). Afterwards, the optimization routine was applied to search for the electric field which maximizes the qubit's coherence time by taking data as shown in FIG. 2*a*. The result was then checked by monitoring the $T_1$-time at the found optimal E-field during another 30 minutes (light shaded data in FIG. 2*b*). Evidently, during most of this time, acquired $T_1$ times after optimization were higher than the reference values that were obtained at zero applied electric field.

Figure 3:
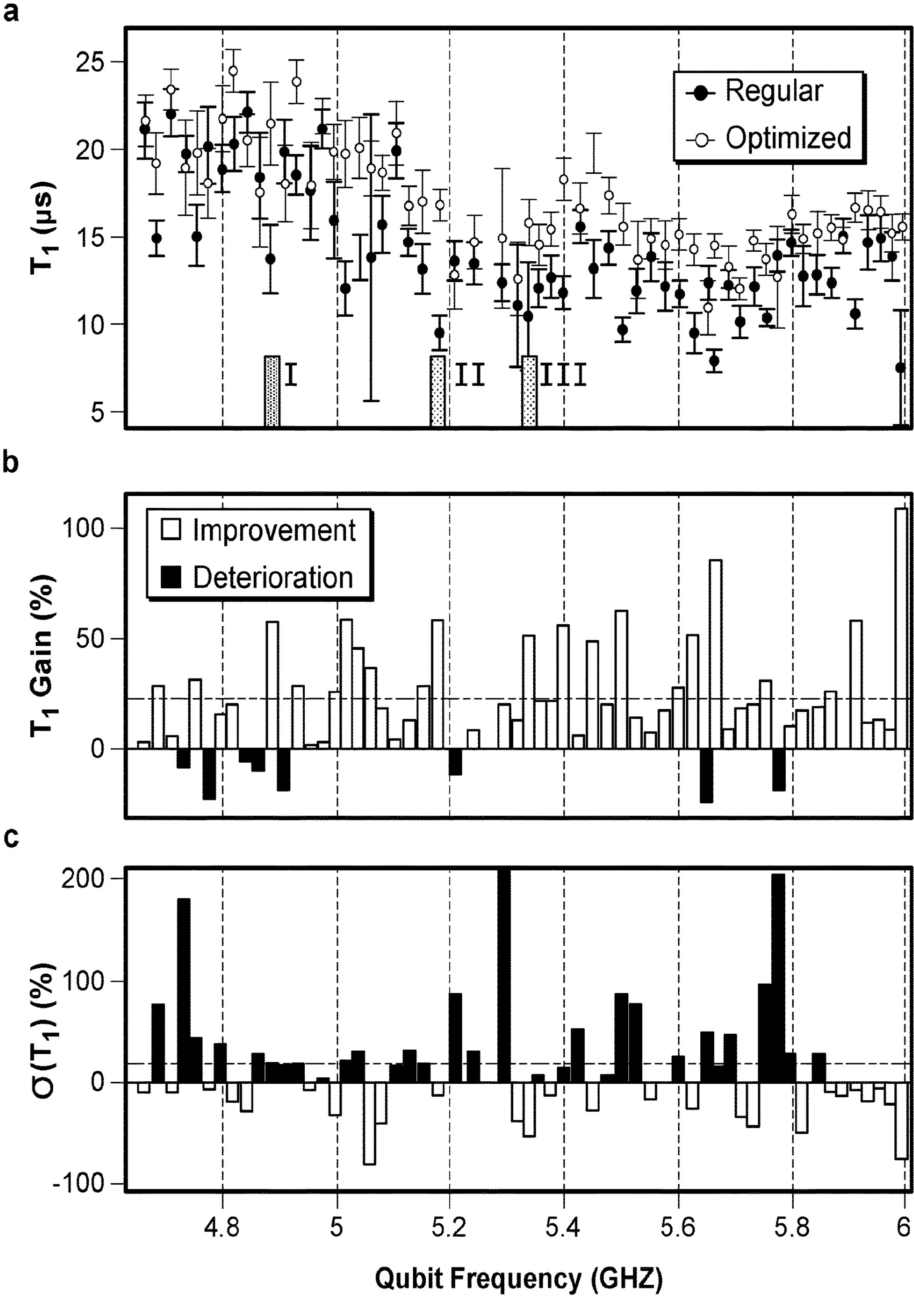
FIG. 3*a* is a plot that shows qubit relaxation times T1 (qubit T1) before and after E-field optimization.
FIG. 3*b* is a plot that shows the relative improvement of qubit T1 after optimization.
FIG. 3*c* is a plot that shows the temporal fluctuation strength of the qubits relaxation times (T1).

To measure the average improvement of the optimization routine, the benchmarking protocol was repeated at various (in total 59) qubit resonance frequencies. FIGS. 3*a* and *b* summarize the absolute and relative improvement of the qubit $T_1$-time at all investigated qubit resonance frequencies. In most cases (85%), the routine improved the 30-minute average qubit $T_1$-time. The improvement was larger than 10% $T_1$ for 67% of the different frequencies examined, and enhanced $T_1$ by more than 20% for 46% of the different frequencies examined. Averaged over all tested qubit resonance frequencies, the $T_1$ time improvement was ≈23%.

To check how much the optimization routine affects the temporal fluctuation strength of the qubit's $T_1$ time, the standard deviation of observed $T_1$ times during the 30 minute intervals before and after optimization were compared. The result is shown in FIG. 3*c*. In slightly more than half cases (59%), the $T_1$ time fluctuations, i.e. standard deviations, increased after optimization. This might be mitigated by enhancing the optimization algorithm such that it prefers broader $T_1$-time peaks which are less sensitive to TLS frequency fluctuations, and by including the $T_1$ fluctuation strength at detected peaks as a criterion.

Method for Optimizing the Qubit Relaxation Time T1

When each qubit in a processor is coupled to a dedicated local gate electrode, the optimization routine can be applied simultaneously on all qubits. This tune-up process is facilitated when no cross-talk of a gate electrode to neighboring qubits occurs. Moreover, the generated electric field should be sufficiently strong all along the edges of the qubit island and the opposing ground plane so that all relevant TLS can be tuned by $\delta\varepsilon$ is bigger or equal 100 MHz to decouple them from the qubit. Assuming a relatively small coupling TLS dipole moment component of p=0.1 eÅ, this corresponds to required field strengths $E=\delta\varepsilon/p=40$ kV/m. Given a typical distance between the DC-electrode and the qubit electrodes of below 1 mm, such E-fields are unproblematically obtained with a bias voltage of a few Volts on the DC-electrode.

Figure 4:
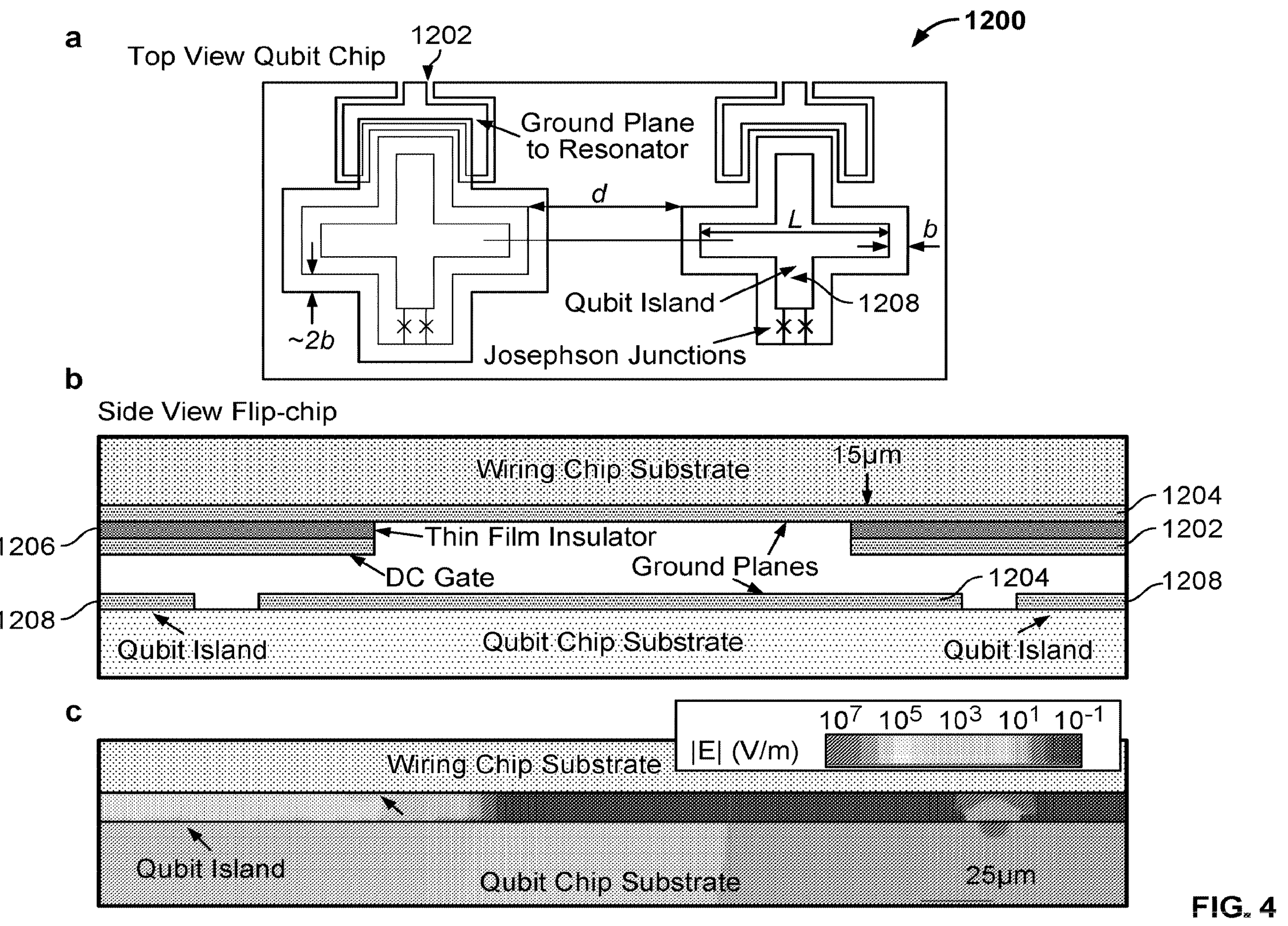
FIG. 4 is a schematic that shows the top view sketch of two example Xmon-qubits.

FIG. 4 shows a possible implementation of a gate electrode array 1200, which is located on a separate wiring chip that is bump-bonded to the chip carrying the qubits in a flip-chip configuration. In FIG. 4*a*, a top view of two Xmon-type qubits is shown, where the gate electrode 1202 above the left qubit is indicated in orange. The electrode 1202 extends slightly over the edges of the qubit island's opposing ground plane to ensure the tunability of TLS in this region.

The cross section of the chip stack is sketched in FIG. 4*b*, showing that the gate electrodes 1202 are separated from the ground plane 1204 of the wiring chip 1200 by a thin film insulator. 1206.

The simulated electric field strength in this region is drawn to-scale in FIG. 4*c*, for the case when the left electrode is biased at 1 V while other metallic parts (including the qubit island 1208) are kept at zero potential. The induced field strength decays on a length scale of roughly the distance between the two chips, given that qubits are surrounded by a ground plane 1204 and also the wiring chip has a ground plane. For a qubit-to-qubit separation of d>100 μm as used in the shown simulation, we accordingly find the cross-talk to be below $10^{-4}$.

Alternatively, the local electrodes could also be placed on the backside of the qubit chip. In this case, the substrate thickness will determine the horizontal field screening length, and stronger cross-talk can be expected. However, finite element modeling (FEM) simulations of the induced E-fields in a given processor layout should allow one to sufficiently compensate for this cross-talk.

Conclusion

An experimental setup and an automatic routine is presented that extends the energy relaxation time $T_1$ of superconducting transmon qubits. The idea is to expose the qubit electrodes to a DC-electric field at which the most detrimental TLS-defects are tuned out of qubit resonance. Averaging over qubit working frequencies and a 30-minute time interval (limited by time constraints), the $T_1$-time was improved by 23% compared to zero applied electric field.

The benefit of the optimization may decrease or vanish with time due to TLS resonance frequency fluctuations. For example, the frequency shifts of TLS may remain smaller than 10 MHz for at least 10 days after application of the E-field, which is consistent with the notion that each TLS can only interact with a limited number of thermally active defects in its vicinity. Thus, the optimization routine may be further improved by repeatedly executing the optimization process over a course of several hours or days, in order to identify an electric field bias that protects the qubit on long timescales from interactions with strongly coupled TLS.

In further experiments, the optimization routine took less than 10 minutes (to acquire about 60 values of qubit $T_1$ at several E-fields). However, the data shown in FIG. 2*a* suggests that the range of applied E-fields may be reduced, which together with further optimizations such as less averaging in individual $T_1$-time measurements, may reduce the optimization time to below 2 or 3 minutes.

Figure 2:
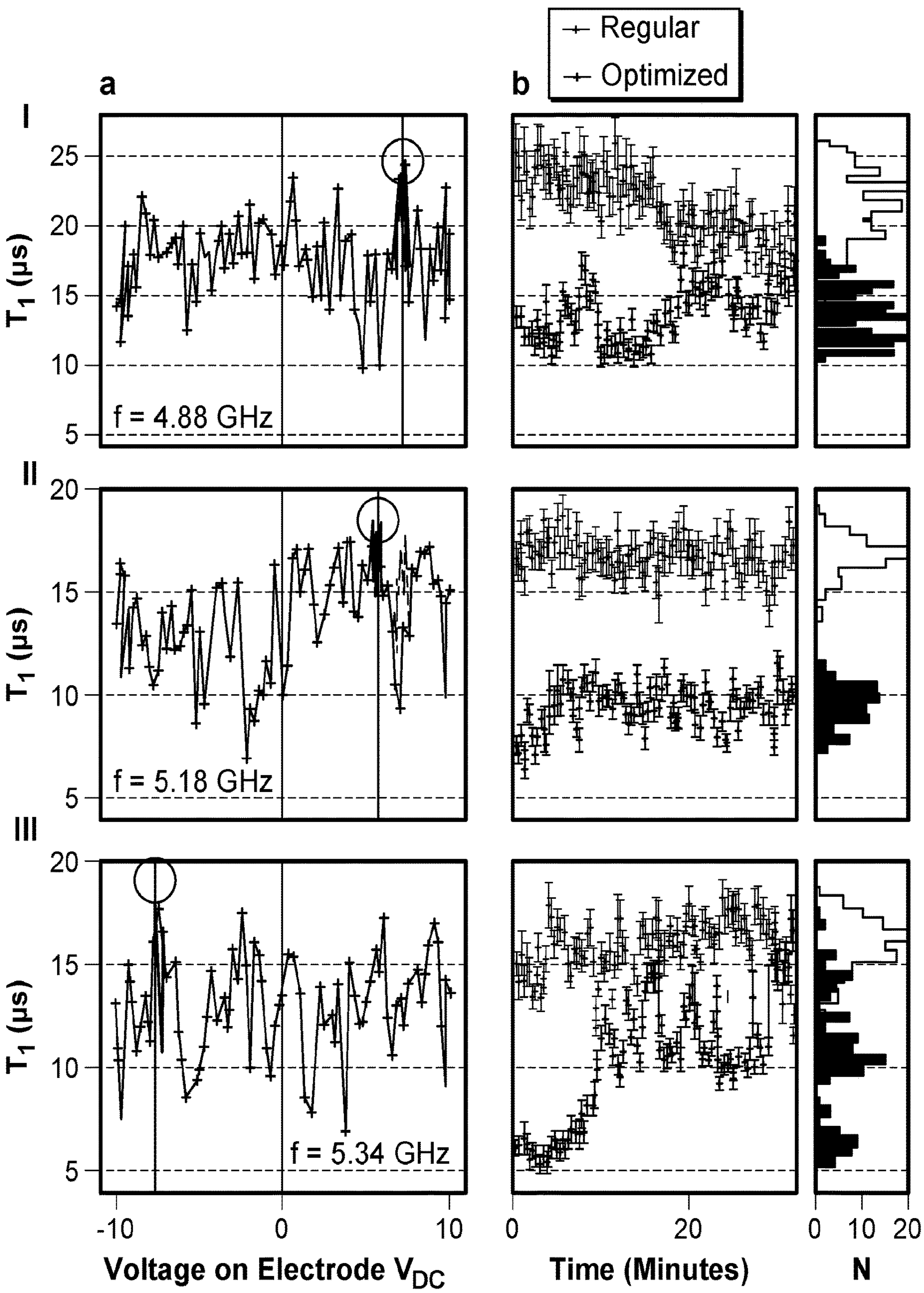
FIGS. 2*a* and 2*b* are a series of plots showing the benchmarking of an optimization algorithm.

Analysis of the raw data such as shown in FIG. 2 suggests that variations of the algorithm described above may provide further stability in some circumstances. For example, in one variation it may be desirable to include width of a peak in $T_1$ vs. E-field as a criterion next to the height of the peak. The skilled person will recognise that other variations and modifications may be applicable in specific circumstances. Moreover, deterioration of the 30-minute average qubit $T_1$ time by the optimization routine, as it occurred in a few (15%) cases in these tests, may be avoided by averaging over several E-field sweeps. This could better account for TLS showing strong resonance frequency fluctuations. Also, a feedback mechanism that regularly readjusts the E-field bias on the basis of qubit error rates obtained during quantum algorithms may be adopted.

The ability to tune TLS out of resonance with a qubit is especially beneficial for processors implementing fixed-frequency qubits. When tunable qubits are used, it is still necessary to mutually balance their individual resonance frequencies to avoid crosstalk and to maximize gate fidelities, and this will be greatly simplified if qubit coherence can be optimized at all frequencies by having independent control of the TLS bath. Also, to improve two-qubit gates that require qubit frequency excursions, one could adjust the optimization procedure to minimize the number of TLS that have resonances in the traversed frequency interval.

The simulations indicated that it is straight-forward to equip each qubit in a processor with local gate electrodes, which will allow one to simultaneously improve $T_1$ of all qubits.

Implementations of the subject matter and operations described in this specification can be implemented in digital electronic circuitry, analog electronic circuitry, suitable quantum circuitry or, more generally, quantum computational systems, in tangibly-embodied software or firmware, in computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

For a system of one or more computers to be "configured to" perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For example, a quantum computer may receive instructions from a digital computer that, when executed by the quantum computing apparatus, cause the apparatus to perform the operations or actions.

Computers suitable for the execution of a computer program can be based on general or special purpose processors, or any other kind of central processing unit. Generally, a central processing unit will receive instructions and data from a read-only memory, a random access memory, or quantum systems suitable for transmitting quantum data, e.g. photons, or combinations thereof.

The elements of a computer include a central processing unit for performing or executing instructions and one or more memory devices for storing instructions and digital, analog, and/or quantum data. The central processing unit and the memory can be supplemented by, or incorporated in, special purpose logic circuitry or quantum simulators. Generally, a computer will also include, or be operatively coupled to receive data from or transfer data to, or both, one or more mass storage devices for storing data, e.g., magnetic, magneto-optical disks, optical disks, or quantum systems suitable for storing quantum information. However, a computer need not have such devices.

Quantum circuit elements (also referred to as quantum computing circuit elements) include circuit elements for performing quantum processing operations. That is, the quantum circuit elements are configured to make use of quantum-mechanical phenomena, such as superposition and entanglement, to perform operations on data in a non-deterministic manner. Certain quantum circuit elements, such as qubits, can be configured to represent and operate on information in more than one state simultaneously. Examples of superconducting quantum circuit elements include circuit elements such as quantum LC oscillators, qubits (e.g., flux qubits, phase qubits, or charge qubits), and superconducting quantum interference devices (SQUIDs) (e.g., RF-SQUID or DC-SQUID), among others.

In contrast, classical circuit elements generally process data in a deterministic manner. Classical circuit elements can be configured to collectively carry out instructions of a computer program by performing basic arithmetical, logical, and/or input/output operations on data, in which the data is represented in analog or digital form. In some implementations, classical circuit elements can be used to transmit data to and/or receive data from the quantum circuit elements through electrical or electromagnetic connections. Examples of classical circuit elements include circuit elements based on CMOS circuitry, rapid single flux quantum (RSFQ) devices, reciprocal quantum logic (RQL) devices and ERSFQ devices, which are an energy-efficient version of RSFQ that does not use bias resistors.

In certain cases, some or all of the quantum and/or classical circuit elements may be implemented using, e.g., superconducting quantum and/or classical circuit elements. Fabrication of the superconducting circuit elements can entail the deposition of one or more materials, such as superconductors, dielectrics and/or metals. Depending on the selected material, these materials can be deposited using deposition processes such as chemical vapor deposition, physical vapor deposition (e.g., evaporation or sputtering), or epitaxial techniques, among other deposition processes. Processes for fabricating circuit elements described herein can entail the removal of one or more materials from a device during fabrication. Depending on the material to be removed, the removal process can include, e.g., wet etching techniques, dry etching techniques, or lift-off processes. The materials forming the circuit elements described herein can be patterned using known lithographic techniques (e.g., photolithography or e-beam lithography).

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties. A superconductor (alternatively superconducting) material can be understood as material that exhibits superconducting properties at or below a superconducting critical temperature. Examples of superconducting material include aluminum (superconductive critical temperature of 1.2 kelvin) and niobium (superconducting critical temperature of 9.3 kelvin). Accordingly, superconducting structures, such as superconducting traces and superconducting ground planes, are formed from material that exhibits superconducting properties at or below a superconducting critical temperature.

In certain implementations, control signals for the quantum circuit elements (e.g., qubits and qubit couplers) may be provided using classical circuit elements that are electrically and/or electromagnetically coupled to the quantum circuit elements. The control signals may be provided in digital and/or analog form.

Computer-readable media suitable for storing computer program instructions and data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or system that may include one or more processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for enhancing the coherence of a qubit, wherein the qubit comprises a qubit electrode with one or more parasitic two-level quantum systems, the method comprising:

applying, by a DC gate electrode, a plurality of electric fields to the qubit electrode, wherein each electric field corresponds to a biasing voltage of the DC gate electrode;

measuring a qubit energy relaxation time at a first qubit operation frequency for each of the plurality of electric fields to provide a plurality of measured qubit energy relaxation times corresponding to the first qubit operation frequency;

determining from a peak of the plurality of measured qubit energy relaxation times, a preferred value of the biasing voltage to reduce the effect of the one or more parasitic two-level quantum systems; and operating the qubit while applying the preferred value of the biasing voltage to the DC gate electrode.

2. The method of claim 1, wherein determining the preferred value of the biasing voltage comprises:

smoothing the plurality of measured qubit energy relaxation times to provide a plurality of smoothed measured qubit energy relaxation times; and determining from a peak of the plurality of smoothed measured qubit energy relaxation times, the preferred value of the biasing voltage.

3. The method of claim 1, wherein the qubit is a superconducting qubit.

4. The method of claim 3, wherein the superconducting qubit is a transmon qubit.

5. The method of claim 4, wherein the transmon qubit is a X-mon qubit.

6. The method of claim 1, wherein the DC gate electrode is above or below the qubit.

7. The method of claim 1, wherein the plurality of electric fields comprises a zero electric field.

8. The method of claim 7, comprising:

quantifying an enhancement of coherence by comparing a measured qubit energy relaxation time corresponding to the preferred value of the biasing voltage to a measured qubit energy relaxation time corresponding to the zero electric field.

9. The method of claim 8, wherein quantifying the enhancement of coherence comprises:

repeatedly measuring the qubit energy relaxation time corresponding to the zero electric field to obtain a plurality of measured qubit energy relaxation times corresponding to the zero electric field; and repeatedly measuring the qubit energy relaxation time corresponding to the preferred value of the biasing voltage to obtain a plurality of measured qubit energy relaxation times corresponding to the preferred value of the biasing voltage.

10. The method of claim 9, wherein quantifying the enhancement of coherence comprises:

performing a comparison of an average of the plurality of measured qubit energy relaxation times corresponding to the preferred value of the biasing voltage to an average of the plurality of measured qubit energy relaxation times corresponding to the zero electric field; and determining a quantification of enhancement based on the comparison.

11. The method of claim 1, comprising:

measuring a qubit energy relaxation time at a second qubit operation frequency for each of the plurality of electric fields to provide a plurality of measured qubit energy relaxation times corresponding to the second qubit operation frequency; and determining from a peak of the plurality of measured qubit energy relaxation times corresponding to the second qubit operation frequency, a preferred value of the biasing voltage, corresponding to the second qubit operation frequency, to reduce the effect of the one or more parasitic two-level quantum systems.

12. The method of claim 1, wherein operating the qubit while applying the preferred value of the biasing voltage to the DC gate electrode reduces the effect of the one or more parasitic two-level quantum systems, wherein reducing the effect of the one or more parasitic two-level quantum systems comprises tuning the one or more parasitic two-level quantum systems out of qubit resonance.

13. The method of claim 1, comprising repeatedly operating the qubit while applying the preferred value of the biasing voltage to the DC gate electrode.

* * * * *